United States Patent

[11] 3,582,168

[72] Inventors Donald J. Bian
697 Parkside, Elmhurst, Ill. 60126;
Allan J. Mager, 7 La Porte Road,
Frankfort, Ill. 60423

[21] Appl. No. 832,935
[22] Filed June 13, 1969
[45] Patented June 1, 1971

[54] PHONOGRAPH RECORD CABINET
6 Claims, 8 Drawing Figs.

[52] U.S. Cl. .......... 312/19
[51] Int. Cl. .......... A47b 81/06
[50] Field of Search .......... 312/15, 19

[56] References Cited

UNITED STATES PATENTS

| | | | |
|---|---|---|---|
| 1,418,555 | 6/1922 | Folkes .......... | 312/19 |
| 2,352,710 | 7/1944 | Hart .......... | 312/19 |
| 2,535,609 | 12/1950 | Spillman .......... | 312/19 |

*Primary Examiner*—Patrick D. Lawson
*Attorneys*—Frank H. Marks and Nathan N. Kraus

ABSTRACT: A cabinet for phonograph disc records having an index and a plurality of parallel grooves, each adapted to receive a record in vertical disposition. An ejector member within the cabinet is slideable longitudinally thereof and is adapted to be selectively actuated in accordance with the index designations to eject a desired record. A slideable panel affords a closure to prevent inadvertent displacement of the records.

INVENTORS
Donald S. Bian
Allan S. Mager
By Nathan N. Kraus
Frank H. Marks
Attys

PHONOGRAPH RECORD CABINET

BACKGROUND OF THE INVENTION

The present invention relates to a cabinet for carrying phonograph disc records and includes means for storing and indexing records within the cabinet so that they may be readily and conveniently stored, located and removed for use with a minimum of effort and time. The records are retained in spaced vertical planes, in conformance with approved practice and are indexed for ready retrieval for use.

SUMMARY OF INVENTION

It is an object of this invention to provide a generally portable container for storing and carrying a plurality of phonograph disc records in safe condition so as to preclude injury thereto.

Another object of this invention is the provision of a cabinet for storing phonograph disc records including means which may be easily actuated to project a selected record from a cabinet for ready use.

A further object of this invention is the provision of a cabinet of the foregoing character, including means for retaining phonograph records in stored condition against inadvertent displacement while transporting the records in the cabinet.

Other and further objects and advantages of this invention will become apparent from the following description when the same is considered in connection with the accompanying drawing.

DESCRIPTION OF THE PREFERRED EMBODIMENT

Figure 1:
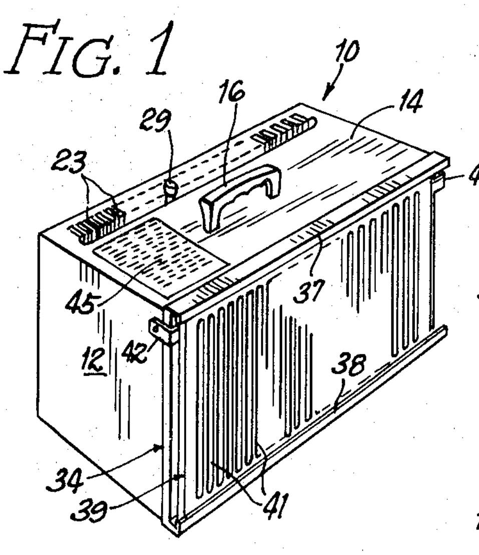
FIG. 1 is a perspective view of a phonograph record cabinet in accordance with our invention.

Referring to the drawings, the numeral 10 indicates, generally, a cabinet in accordance with our invention, said cabinet comprising a bottom wall 11, end walls 12, a rear wall 13 and a top wall 14. A handle member 16 is attached to the top wall for convenience in carrying the cabinet. The bottom wall 11 is provided with a plurality of relatively closely spaced grooves 17, each being of sufficient width to accommodate a phonograph disc record. It is understood that the cabinet is of such size as to receive a particular record size, such as the 45 r.p.m. type or the 12 inch long-playing 33 r.p.m. type. Each of the grooves 17, of course, is of such width as to freely accommodate a particular record size and the spaces between the grooves are sufficient to separate adjacent records and to prevent abrasion therebetween. It will be understood that the grooves 17 terminate a short distance from the rearward edge of the bottom panel 11, as illustrated in FIG. 2, and that said grooves cover substantially most of the area of the bottom panel.

Figure 2:
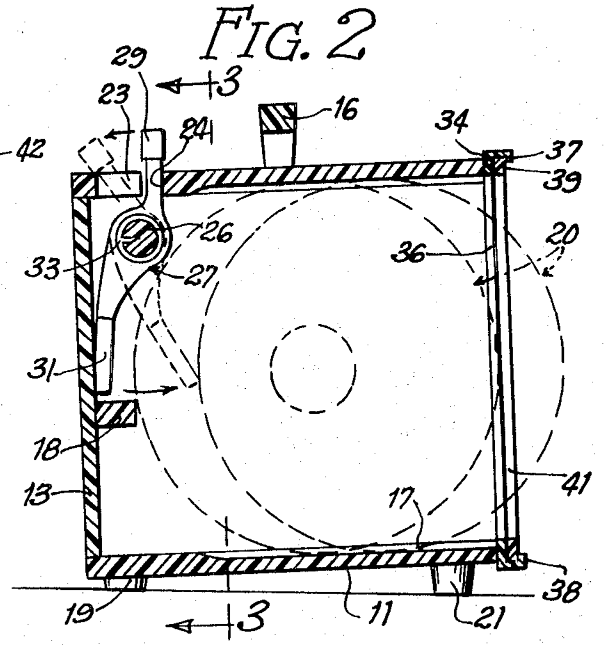
FIG. 2 is a transverse cross-sectional view, on an enlarged scale, of the cabinet.
Figure 3:
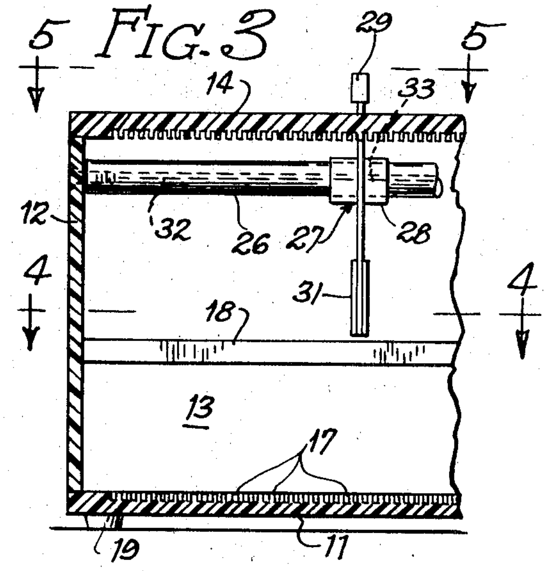
FIG. 3 is a fragmentary cross-sectional view, taken substantially on line 3–3 of FIG. 2.
Figure 4:
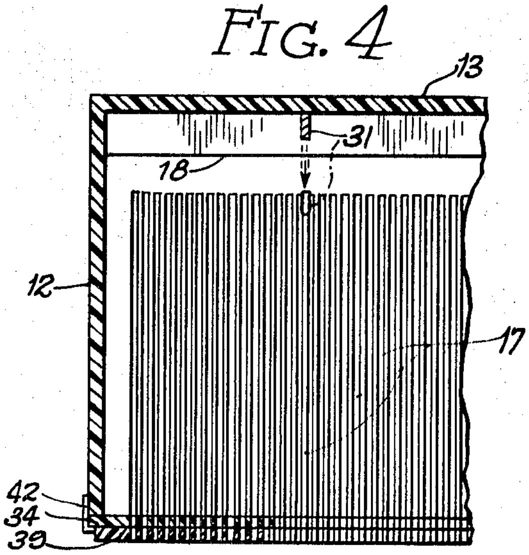
FIG. 4 is a fragmentary cross-sectional view taken substantially on line 4–4 of FIG. 3.
Figure 5:
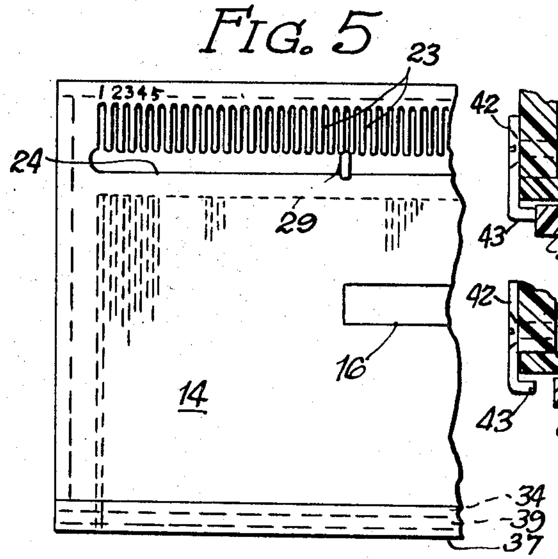
FIG. 5 is a fragmentary top plan view taken substantially on line 5–5 of FIG. 3.

An abutment member 18 is fixed to the rear wall 13 and extends longitudinally thereof so as to afford a stop for the records 20 which are disposed in the grooves, as illustrated in FIG. 2. The cabinet 10 is supported on feet 19 and 21, the forward feet 21 being somewhat higher so as to incline the bottom panel 11 rearwardly and thereby maintain the records 20 in engagement with stop member 18.

The top panel 14 is provided with a series of spaced slots 23, each of which is in vertical planar registration with a respective slot 17. Each of the slots 23 opens into a longitudinally extending slot 24. Journaled in the end walls 12 is a longitudinally extending rod 26 spaced below the slot 24. Supported for sliding movement on the rod 26 is an ejector member 27 which includes a hub portion 28, a finger-engaging portion 29 projecting upwardly through the slot 24 and a depending ejector finger 31 adapted to selectively engage the records 20. The rod 26 is provided with a longitudinally extending keyway 32 in which is received one end of a key member 33 carried on the hub 28.

Figure 8:
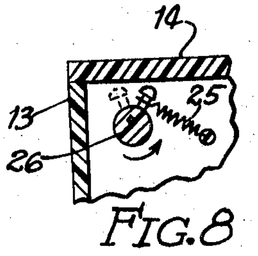
FIG. 8 is a fragmentary cross-sectional view of a structural detail.

Referring to FIG. 8, the rod 26 is provided at one end with a screw extending radially thereof and hooked to one end of a spring 25 which is anchored in the wall 12 so as to bias the rod 26 to the nonoperative position, illustrated by the solid lines in FIG. 2, in which the finger-engaging portion 29 is disposed in the longitudinal slot 24. It will be understood that the finger-engaging portion 29 is of such width that it may enter into any one of the slots 23 so as to permit rocking of the ejector member 27 from the solid line to the dotted line position illustrated in FIG. 2.

Figures 6, 7:
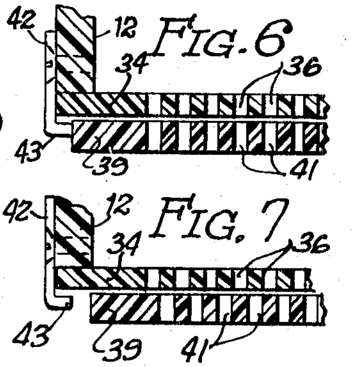
FIG. 6 is a fragmentary cross-sectional view of a detail showing the front panel of the cabinet in open position.
FIG. 7 is a similar view showing the front panel in closed position.

A front panel 34 is suitably attached to the forward edges of the top, bottom and end walls of cabinet 10. The front panel 34 is provided with a plurality of vertical slits 36 which terminate short of the longitudinal edges of the panel and are arranged in vertical planar registration with respective grooves 17 of the bottom panel 11. The panel 34 is provided with integral L-shaped flanges 37 and 38 extending, respectively, longitudinally of the top and bottom edges of the panel 34. A slideable panel 39 provided with vertical slits 41, substantially identical to the slits 36 of the forward panel 34, is retained by the flanges 37 and 38 in substantially contiguous relation to the front panel 34. An L-shaped bracket 42 is secured to each of the end walls 12 and has a portion 43 extending into the path of movement of the slideable panel 39. These brackets prevent inadvertent displacement of the panel 39 while limiting its longitudinal movement. Referring to FIG. 6, it will be seen that the panel 39 may be moved so that the slits 41 are in registration with the slits 36 to permit a disc record 20 be passed therethrough, or the panel 39 may be shifted to the position illustrated in FIG. 7 wherein the slits 41 are offset from the slits 36 of the panel 34 thereby blocking slits 36 and preventing the passage of any disc records through the slits. When the slideable panel 39 is disposed in the position illustrated in FIG. 7 any records contained within the cabinet are retained in their respective grooves against inadvertent displacement and the cabinet together with the records may be conveniently transported without fear of any records falling out of the cabinet.

The operation of our record cabinet should be apparent from the foregoing description but briefly stated it is as follows: In order to load the cabinet 10 with records 20, the panel 39 is moved to the position illustrated in FIG. 6 so that a plurality of records may be passed, each through respective registering slits 36 and 41 to be received in respective grooves 17 within the cabinet. It will be noted that each record assumes the vertical position illustrated in FIG. 2 wherein the rearward peripheral edge portion is in abutment with stop 18 and the forward peripheral edge portion of the record extends into a slit 36 of the forward panel 34. Thus, the record is free to move outwardly of the cabinet when it is so projected by the selector member 27.

The top panel 14 preferably carries an index card 45 identifying each of the slots 23, each of which is correspondingly numbered, so that when the user desires to select a particular record he merely moves the selector element 27 into registration with a selected slot 23 corresponding to the record desired and rocks the selector element 27, as illustrated in FIG. 2, to effect engagement of the ejector finger 31 with the rearward peripheral edge portion of the record to project the same outwardly through the registering slits. After use, the record is reinserted through the same slits and returned to its original position.

When it is desired to carry or transport the cabinet 10 the slideable panel 39 is moved to the position illustrated in FIG. 7 so that the slits 36 and 41 of the forward panel 34 are blocked and the passage of records therethrough is prevented. In normal storage the cabinet is inclined rearwardly, as viewed in FIG. 2, so that the records contained within the cabinet are prevented from inadvertently rolling or falling out of the cabinet.

It will be understood that our invention also is applicable to stationary cabinets of various sizes for storing phonograph disc records which are not necessarily portable.

Various changes coming within the spirit of our invention may suggest themselves to those skilled in the arts; hence, we do not wish to be limited to the specific embodiment shown and described or uses mentioned but intend the same to be merely exemplary, the scope of our invention being limited only by the appended claims.

We claim:

1. A record cabinet comprising a. a base having a series of spaced parallel grooves, each adapted to receive a disc record with said records being coaxially arranged, b. an ejector member, c. means supporting said ejector member for pivotal movement and for sliding movement along a path parallel to the axis of said records, d. said ejector member being selectively movable into registration with one of said records and rockable into engagement therewith to eject said one record from said groove, said supporting means comprising a rod and the member including a depending record-engaging portion and a finger-engageable actuating portion, and a top panel having a slot extending longitudinally and parallel to said rod and a series of spaced slots, each of said slots being coplanar with a respective one of said grooves and opening into said longitudinally extending slot, said actuating portion of said ejector member passing through said last mentioned slot and being adapted to enter into one of said series of slots when said ejector member is rocked to eject a record.

2. The invention as defined in claim 1 including means for normally biasing said ejector member out of engagement with any one of said records.

3. The invention as defined in claim 1 including means associated with each of the slots in said series for identifying each of the records received in said grooves.

4. The invention as defined in claim 1 including a fixed front panel having a series of slits, each in planar registration with a respective groove, with said records being adapted to pass through said slits and means for selectively blocking said slits.

5. The invention as defined in claim 6 in which the blocking means includes a movable panel adjacent said front panel and having a similar series of slits, said movable panel being selectively movable so as to dispose the slits thereof in or out of registration with corresponding slits of said front panel, said slits when in registration permitting the passage of records out of said cabinet and when out of registration blocking the passage of records out of said cabinet.

6. The invention as defined in claim 1 including a fixed front panel having a series of slits, each in planar registration with a respective groove, moveable panel adjacent said front panel and having a similar series of slits, said moveable panel being adapted for selective movement so as to dispose the slits thereof in or out of registration with corresponding slits of said front panel, said slits when in registration permitting the passage of records out of said cabinet and when out of registration blocking the passage of records out of said cabinet.